(12) United States Patent
Shrader et al.

(10) Patent No.: US 6,268,821 B1
(45) Date of Patent: Jul. 31, 2001

(54) MULTIPLE BAND SIDELOBE CANCELLER

(75) Inventors: William W. Shrader, Stow; Vilhelm Gregers Hansen, Framingham, both of MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 05/844,260

(22) Filed: Oct. 21, 1977

(51) Int. Cl.[7] .................................................. G01S 7/36
(52) U.S. Cl. ............................ 342/17; 342/159; 342/194; 342/195; 342/379
(58) Field of Search ................ 340/100 LE, 100 CL, 340/18 E, 5 SA; 342/13, 14, 15, 16, 17, 18, 19, 159, 162, 192, 194, 195, 196, 379, 380, 389

(56) References Cited

U.S. PATENT DOCUMENTS

| | | | |
|---|---|---|---|
| 3,202,990 | * | 8/1965 | Howells .......................... 343/100 LE |
| 3,611,375 | * | 10/1971 | Chambers et al. ................... 342/110 |
| 3,860,924 | * | 1/1975 | Evans ....................................... 342/94 |
| 3,879,661 | * | 4/1975 | Collins ............................... 324/76.24 |
| 3,881,177 | * | 4/1975 | Len et al. ........................ 343/100 LE |
| 3,938,153 | * | 2/1976 | Lewis et al. ..................... 343/100 LE |
| 3,943,511 | * | 3/1976 | Evans et al. ............................. 342/94 |
| 3,978,483 | * | 8/1976 | Lewis et al. ..................... 343/100 LE |
| 4,042,925 | * | 8/1977 | Albanese et al. ..................... 342/132 |
| 4,057,802 | * | 11/1977 | Dollinger ........................ 343/100 LE |

* cited by examiner

Primary Examiner—John B. Sotomayor
(74) Attorney, Agent, or Firm—Daly, Crowley & Mofford, LLP

(57) ABSTRACT

A radar system including a main antenna and a smaller auxiliary antenna, the main antenna having a radiation pattern with a main lobe and relatively small sidelobes, and the auxiliary antenna having an omnidirectional radiation pattern. A received signal in the sidelobes of the main antenna and the corresponding received signal of the auxiliary antenna are spectrally divided by sets of bandpass filters with the signals of corresponding ones of the bandpass filters being processed to null out a signal such as a jamming signal received via a sidelobe of the main antenna pattern. The processing includes inphase and quadrature detection of a partially cancelled signal with the resulting complex error signal being applied as a modulation of the signal of the auxiliary antenna to be subtracted from the signal of the main antenna to produce the cancelled sidelobe signal.

7 Claims, 3 Drawing Sheets

MULTIPLE BAND SIDELOBE CANCELLER

BACKGROUND OF THE INVENTION

In military applications involving a radar system such as a missile tracking radar which tracks a friendly signal from a missile, an enemy jamming signal may be present outside the main lobe of the radiation pattern of the radar antenna to be received via a sidelobe of the radiation pattern which has a very much lower gain than the gain of the main lobe. An auxiliary antenna having an omnidirectional radiation pattern may be utilized to produce a second received jamming signal which can be subtracted from that received by the sidelobe of the aforementioned tracking antenna, or main antenna, to remove the effect of the jamming signal as a source of error in the tracking operation. A problem arises in that the electrical phase centers of the two antennas must necessarily be displaced with the result that, for the typical broad band jamming signal, a temporal delay exits between the propagations from the jamming source to each of the antennas, this producing a decorrelation between the waveforms and a difference in the phases of the received jamming signals. The phase differences are frequency dependent with the result that when the jamming signal from the auxiliary antenna is combined with the jamming signal received by the sidelobe of the main antenna, good cancellation of the jamming signal is obtained only over a relatively narrow spectrum of the passband of the radar system, other frequency components of the jamming signal lying within the passband of the radar system being attenuated, or cancelled, to a lesser extent. Thereby, an undesireably large amount of jamming signal power is found with the friendly signal from the missile resulting in a diminution of precision in tracking the friendly signal.

SUMMARY OF THE INVENTION

The aforementioned problem is overcome and other advantages are provided by a sidelobe canceller system for a radar employing a main radar antenna and an auxiliary radar antenna wherein, in accordance with the invention, two identical sets of bandpass filters are utilized for receiving the signal of the auxiliary antenna and the signal of the main antenna. The main antenna may have the aforementioned radiation pattern of a main lobe and relatively small sidelobes, while the auxiliary antenna has the aforementioned omnidirectional radiation pattern. The jamming component of signal appearing in each bandpass filter of the main antenna is separately cancelled by use of the auxiliary antenna signal appearing in the corresponding bandpass filter of the auxiliary antenna. Thereafter, each of the signals, including a residue of the jammer cancellation, appearing in the respective ones of the bandpass filters of the main antenna are summed together to regenerate the complete received signal of the main antenna, the received signal comprising the aforementioned friendly signal with a residual amount of uncancelled jamming signal.

The widths of the bandpass filters are sufficiently small such that the temporal delays between the propagation times of the jamming signals to each of the radar antennas is small compared to the response time of an individual one of the bandpass filters. Thereby, the amount of decorrelation between the waveforms of the portions of the jamming signal appearing within a bandpass filter of the main antenna and the corresponding filter of the auxiliary antenna are sufficiently small such that adequate cancelling can be accomplished with respect to that portion of the jamming signal.

Upon the aforementioned summing together of the signals with the residues in each of the bandpass filters of the main antenna, it is found that the resulting uncancelled residue is very much smaller than that of the friendly signal appearing in the summation of the signals; thus, the jamming signal has been adequately cancelled.

With respect to the cancellation of the portion of the jamming signal appearing in an individual one of the bandpass filters of the main antenna, a replica jamming signal, obtained with the aid of a reference signal from the corresponding bandpass filter of the auxiliary antenna, is subtracted from the aforementioned signal appearing in the individual one of the bandpass filters of the main antenna. The subtraction produces a cancelled signal, the adequacy of the cancelling of the cancelled signal depending on the amplitude and phase of the replica signal. The cancelled signal is detected by inphase and quadrature synchronous detectors utilizing the reference signal of the auxiliary antenna, the synchronous detection producing orthogonal vector representations of the cancelled signal relative to the reference signal which facilitate a vector rotation of the reference signal to bring it into phase with the aforementioned signal of the corresponding bandpass filter of the main antenna. The synchronously detected signals are filtered and then applied as multiplying factors to a pair of multipliers for a complex multiplication times the reference signal. The multiplication may be accomplished by amplitude modulators and alters the amplitude of the vector components to produce the vector rotation and magnitude scaling of the reference signal. The products of the pair of multipliers are summed together to produce the replica signal. The foregoing replica generation circuitry operates in the form of a feedback loop wherein the loop gain minimizes differences between the amplitude and phase of the replica and that of the signal appearing in the main antenna.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
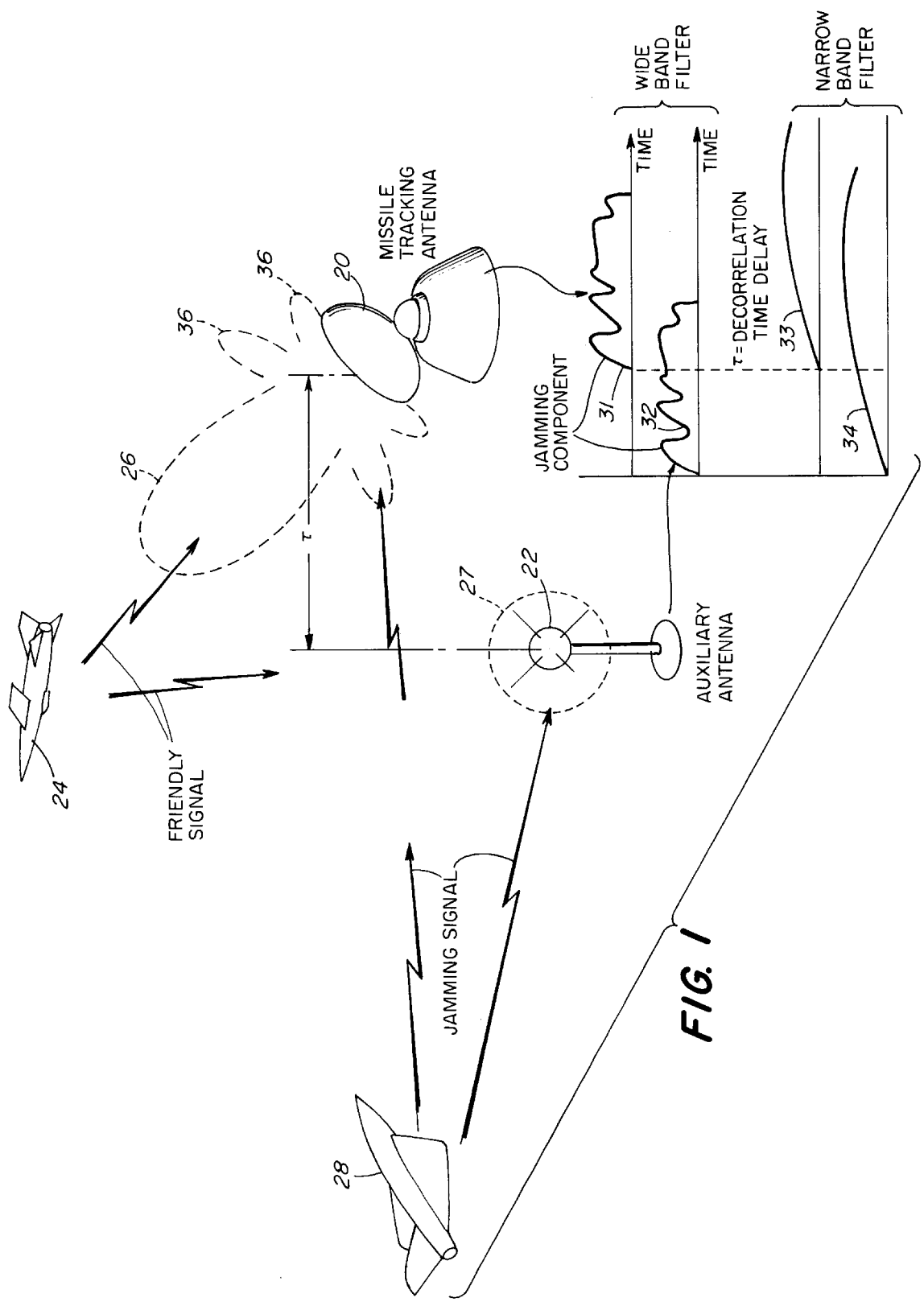
FIG. 1 is a stylized pictorial representation of a tracking antenna and an auxiliary antenna including a graphical presentation of wide band and narrow band signals received by these antennas in accordance with the invention.

Referring now to FIG. 1, there is seen a main antenna 20 and an auxiliary antenna 22 positioned for receiving a friendly signal from a missile 24. The main antenna 20, by way of example, is shown as a radar tracking antenna which is mechanically or electronically steered to direct the main lobe 26 of its radiation pattern in the direction of the missile 24 to receive the radiation of the friendly signal therefrom. The auxiliary antenna 22 has an omnidirectional radiation pattern 27. Also, shown is a source 28, such as an airborne transmitter, of a jamming signal which is radiated toward both the main antenna 20 and the auxiliary antenna 22. A set of four graphs 31–34 are shown in registration with each other and appended to the antennas 20 and 22 for portraying the signals received by the antennas 20 and 22, the graphs 31 and 32 being the portrayal of a signal as viewed by a wide band filter, while the graphs 33 and 34 portray the signals as seen by a narrow band filter.

The side lobes 36 of the radiation pattern of the main antenna 20 produce a signal gain which is substantially smaller, for example by a factor of 40 dB (decibels), than the gain by the main lobe 26. Thereby, the jamming signal received via the side lobe 36 is comparable in amplitude to the friendly signal received by the main lobe 26 even though the jamming signal is many times larger, for example, possibly as much as 40 dB. In contrast, the jamming signal received by the auxiliary antenna 22 is very much greater in amplitude than the friendly signal because of the uniformity of the radiation pattern. Thus, even though the friendly signal and the jamming signal propagate toward the auxiliary antenna 22 from different directions, the antenna gain from both directions is substantially the same with the result that the relative magnitudes of the jamming and friendly signals is retained.

The foregoing relationship between the relatively large jamming signal and the relatively small friendly signal as received by the auxiliary antenna 22 permits an accurate jamming reference signal to be extracted from the sum of the friendly and jamming signals at the output of the auxiliary antenna 22. This reference can then be utilized for the generation of a signal which is an accurate replica of the jamming component of the summation of the friendly and jamming signals produced by the main antenna 20. Circuitry for producing the reference and replica signals will be disclosed hereinafter with reference to FIG. 2. An important factor in the degree of similarity between the replica signal and the jamming signal actually received by the main antenna 20 is the amount of coherence between the jamming signal received at the two antennas 20 and 22.

When the jamming signals received at the antennas 20 and 22 are coherent with each other, this being the case when the times of arrival of the jamming signals are substantially equal at the two antennas 20 and 22, a maximum correlation is obtained between the reference signal and the jamming signal received at the main antenna 20. A decorrelation and lack of coherence result when jamming signals reach the antennas and 22 at differing times, FIG. 1 showing the situation wherein the main antenna 20 receives the jamming signal after the auxiliary antenna 20 receives the jamming signal, the time delay, $\tau$, being shown on the graphs 31–34.

A feature of the invention is based on the recognition that the loss in correlation depends both on the magnitude of the aforementioned time delay as well as on the bandwidth of the jamming signal. In the case of a relatively narrow bandwidth jamming signal, the amplitude of the signal varies slowly with time so that, even in the case of a maximum time delay which occurs when the source 28 is colinear with the auxiliary antenna 22 and the main antenna 20, the amount of decorrelation is sufficiently small such that a minimal residue results from the cancellation of the jamming signal. However, for a relatively wide bandwidth jamming signal, wherein the amplitude of the signal varies rapidly with time, the jamming signal received at the auxiliary antenna 22 is substantially decorrelated from the jamming signal received through the sidelobes 36 of the main antenna 20. With reference to the graphs 31–34, the jamming component of the sum of the jamming and friendly signals received by the main antenna is presented in graph 31 and is presented in graph 32 for the auxiliary antenna 22. The graphs 33 and 34 correspond respectively to the graphs 31 and 32 and depict the situation wherein a filter, having approximately one-tenth the bandwidth of the filter utilized for the graphs 31 and 32, is employed for coupling a relatively narrow portion of the bandwidth of the signals passed by the antennas 20 and 22.

Figure 2:
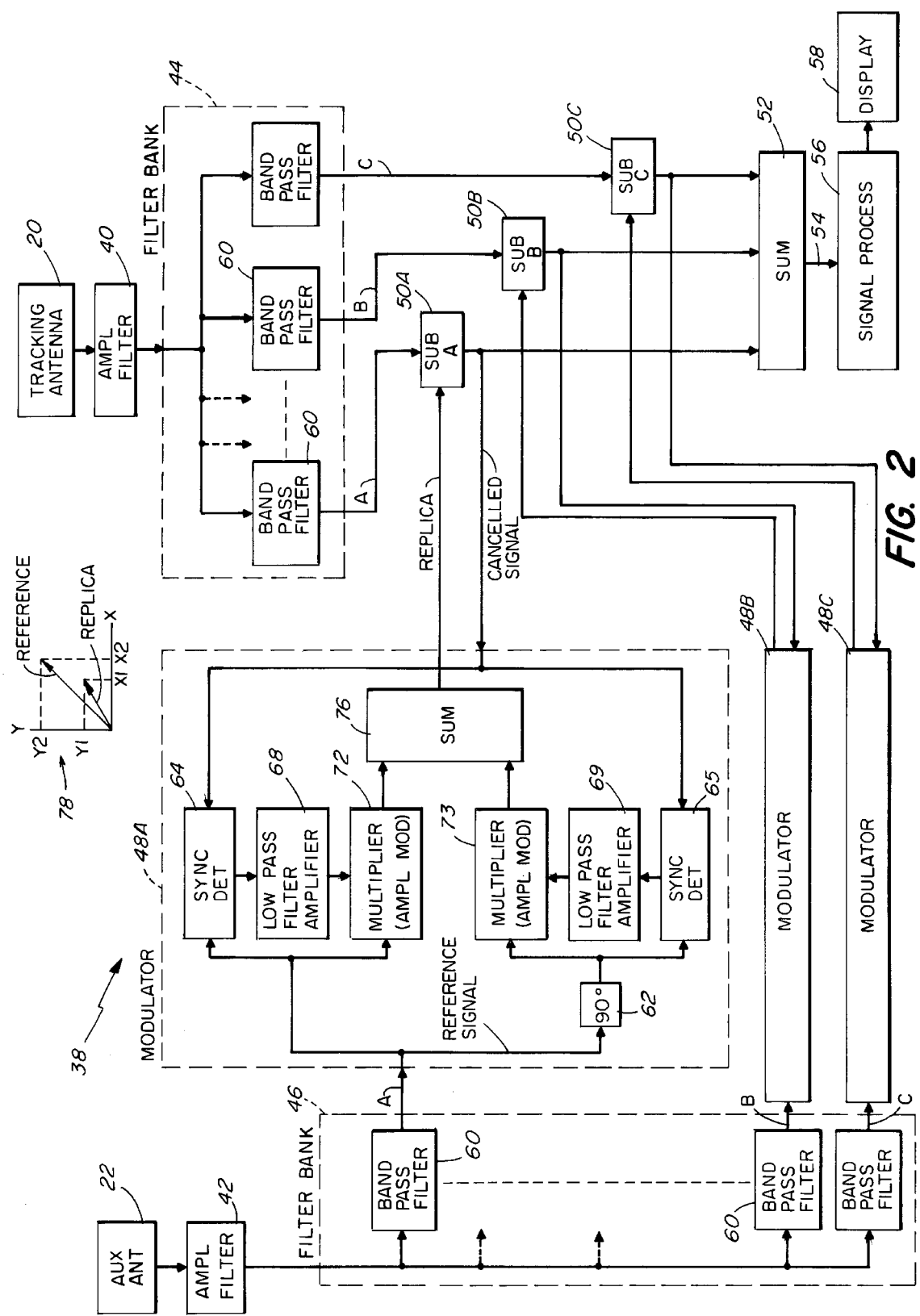
FIG. 2 is a block diagram of a system, coupled to the antennas of FIG. 1, for cancelling a jamming signal in accordance with the invention.

Referring now to FIG. 2, there is seen a block diagram of a system 38 coupled between the auxiliary antenna 22 and the main antenna 20 for cancelling the jamming component present in the signal received by the main antenna 20. Amplifiers 40 and 42 are coupled respectively to the antennas 20 and 22 for amplifying the signals received therefrom to a sufficient amplitude for operation of the system 38. The amplifiers 40 and 42 include bandpass filters having a pass band equal to the bandwidth of the friendly signal of FIG. 2 for receiving that signal and excluding the spectral components of noise and jamming signal lying outside the bandwidth of the friendly signal.

In accordance with the invention, the system 38 further includes a pair of filter banks 44 and 46 coupled via the amplifiers 40 and 42 respectively to the main antenna 20 and the auxiliary antenna 22, a set of modulators 48 with individual ones thereof being further identified by the legends A, B and C when it is desired to refer to a specific one of the modulators 48, a set of subtractors 50 with individual ones thereof being further identified by the legends A–C, and a summer 52. The output signal of the summer 52 on line 54 comprises the regenerated friendly signal with a minimal amount of residue of the cancelled jamming signal. By way of example, the signal on line 54 is shown being applied to a signal processor 56 for futher filtering and signature identification as is well known in the radar art, an output signal of the signal processor 56 being displayed on a display 58 for presenting data of the missile 24 of FIG. 1.

The amplifiers 40 and 42 have the same pass band to enable reception of the friendly signal by both the antennas 20 and 22. Similarly the frequency characteristics of the two filter banks 44 and 46 are the same for deriving the corresponding spectral components of the signals received by the antennas 20 and 22. The overall pass band of the filter bank 44 is equal to the pass band of the amplifier 40 and, similarly, the overall pass band of the filter bank 46 is equal to the pass band of the amplifier 42. The filter banks 44 and 46 comprise a set of bandpass filters 60 each of which is tuned to a specific band of frequencies, the pass band of one of the filters 60 in the filter bank 44 being contiguous in the frequency spectrum to the pass band of the adajacent filter 60, the pass bands of each of the filters 60 in the filter bank 46 being equal to that of the corresponding filter 60 in the filter bank 44. By way of example, ten filters 60 may be employed in the filter bank 44 with an equal number in the filter bank 46, the pass bands of the filters 60 of the filter bank 44 being approximately equal for dividing the pass band of the amplifier 40 into ten contiguous spectral portions. For example, considering the amplifier 40 to have a pass band of one MHz (megahertz), each of the filters 60 of the filter bank 44 have pass bands of approximately 100 kHz (kilohertz). It is noted that the pass bands of the filter 60 may each be equal to 100 kHz or, alternatively, the pass bands of the filter 60 may vary slightly in geometeric fashion such that the ratio of pass band to center frequency of an individual one of the filters 60 is equal to the ratio of pass band to center frequency of each of the other filters 60.

To facilitate the description, only three of the bandpass filters 60 are shown in each of the filter banks 44 and 46. The output signals of the three filters 60 of the filter bank 44 are individually processed by signal channels identified by the legends A, B and C. Similarly, the signals from the corresponding bandpass filters 60 of the comb filter 46 are utilized as reference signals respectively for the channels A, B and C. The modulator 48A and the subtractor 50A form a part of channel A and similarly, the modulators 48B and 48C and the subtractors 50B and 50C respectively form parts of the channels B and C.

In accordance with the invention, the signals in each of the channels A, B and C are separately processed for cancelling the jamming component of the jamming signal present in the individual channels. Thus, for example, with reference to channel A, a replica signal produced by the modulator 48A is subtracted from the bandpass filter 60 of the filter bank 44 by the subtractor 50A to produce a cancelled signal, the cancelled signal comprising the component of the friendly signal passed by the bandpass filter 60 of the filter bank 44 plus the residue of the jammer cancellation operation. Similar comments apply to the subtraction operation of the subtractors 50B and 50C. Thereafter, the cancelled signals from each of the subtractors 50 are summed together by the summer 52 to produce the regenerated friendly signal on line 54, the signal on line 54 also including residues from the jammer cancellation operation.

Referring also to the graphs 31–34 of FIG. 1, a signal of graph 31 corresponds to the signal appearing at the output of the amplifier 40 while the signal of the graph 32 appears at the output of the amplifier 42. The signal of graph 33 appears at the output of one of the bandpass filters 60 of the filter bank 44, for example, the filter 60 of channel A. Similarly, the signal of graph 34 appears at the output of the filter 60 of the filter bank 46 for channel A. Thus, it is seen that each of the channels of the system 38 operates with signals which are slowly varying in time because of the relatively narrow bandwidths of the filters 60, these bandwidths being only one-tenth the pass band of the amplifiers 40 and 42 in the present example. Again, with reference to the graphs 33–34, it is seen that the time delay between the times of reception of the jamming signals at the antennas 20 and 22 is sufficiently small relative to the overall waveform of the signal being processed by channel A such that the modulator 48, by suitably scaling the vector of the reference signal of channel A and by suitably adjusting the phase angle of the vector, can produce a replica closely approximating the instantaneous amplitude and phase of the vector representing the jamming component provided by the filter bank 44 for channel A.

Each modulator 48 comprises a 90° phase shifter 62, synchronous detectors 64 and 65, low pass filters 68 and 69 each of which includes an amplifier (not shown), multipliers 72 and 73 which comprise amplitude modulators and a summer 76. With reference to the operation of the modulator 48A, the operation of the modulators 48B–C being identical thereto, the synchronous detector 64 receives at one input terminal a reference signal from the filter bank 46 and at its second input terminal a cancelled signal from the subtractor 50A. Recalling that the amplitude of the jamming signal received at the auxiliary antenna 22 in very much larger than the amplitude of the friendly signal received at the antenna 22, the reference signal of channel A is almost wholly composed of the jamming signal and therefore enables the detector 64 to synchronously detect the inphase component of the jamming signal in the cancelled signal of the subtractor 50A. In a similar fashion, the reference signal is shifted 90° by the phase shifter 62 and applied to the detector 65 for synchronously detecting the quadrature component of the jamming signal in the cancelled signal of the subtractor 50A. The production of inphase and quadrature components of the vector representing the jamming signal from the subtractor 50A enables the rotation of the vector and the scaling of the vector by simply multiplying the inphase and quadrature components by suitable multiplying factors. These mutliplying factors represent the loop gain provided by the amplifier of the filter 68 for the inphase component and the loop gain of the amplifier of the filter 69 for the quadrature component. Thus, the amplitude of the reference signal is scaled in the multiplier 72 by a factor proportional to the detected inphase component of the jamming signal provided by the detector 64. Similarly, the amplitude of the quadrature reference signal is scaled by the multiplier 73 with a factor proportional to the amplitude of the quadrature jamming component is detected by the detector 65. The bandwidth of low pass filters 68 and 69 is selected to produce an overall feedback bandwidth commensurate with the bandwidth of filters 60 of the filter bank 44.

A graph 78 adjacent the modulator 48A demonstrates the rotation and scaling of the reference signal vector to produce the replica signal vector by the aforementioned process of scaling the inphase and quadrature components of the reference vector. Thus, for example, considering the X axis to represent the inphase component and the Y axis to represent the quadrature component, it is seen that a scaling of the inphase value X2 to produce X2 and a scaling of the quadrature value Y2 to produce the value Y1 results in a replica which is rotated from the reference vector and also has a different magnitude from the reference vector. The inphase and quadrature components as scaled by the multiplier 72 and 73 are summed together by the summer 76 to produce the replica signal for the subtractor 50A, the summation of the scaled components of the reference signal being in accordance with the vector summation of the graph 78. The construction of feedback loops which are similar in operation to that of the modulator 48 may be seen in FIG. 2 of the U.S. Pat. No. 3,939,407 which issued in the name of W. J. Bickford on Feb. 17, 1976, and also in FIG. 5 of the U.S. Pat. No. 3,794,921 which issued in the name of M. G. Unkauf on Feb. 26, 1974. The use of such feedback loops in adaptive antennas is disclosed in articles by Howells and Appelbaum in the IEEE Transactions on Antennas and Propagation, September 1976 at pages 575 through 598.

By way of alternative embodiments it is noted that a filter bank such as the filter bank 44 having many bandpass filters 60, for example, twenty or thirty of the bandpass filters 60 may be regarded as a spectrum analyzer wherein each filter of the spectrum analyzer produces a narrow bandwidth signal about the spectral line to which the filter is tuned. Spectrum analyzers may be synthesized by means of a digital fast Fourier transformer wherein the signals produced by an antenna and its amplifier, such as the antenna 20 and its amplifier 40, are first converted by an analog-to-digital converter (not shown in the figures) to digital numbers representing a succession of samples of the signal taken over a predetermined interval of time, the succession of samples being applied to the aforementioned digital fast Fourier transformer to produce an equal set of numbers each of which represents the amplitude of a signal at the corresponding Fourier spectral line. The analog operation of the modulator 48 would then be replaced by the analogous digital operation to produce a cancellation of the jammer component in a manner analogous to that which has been described with reference to FIG. 2.

Figure 3:
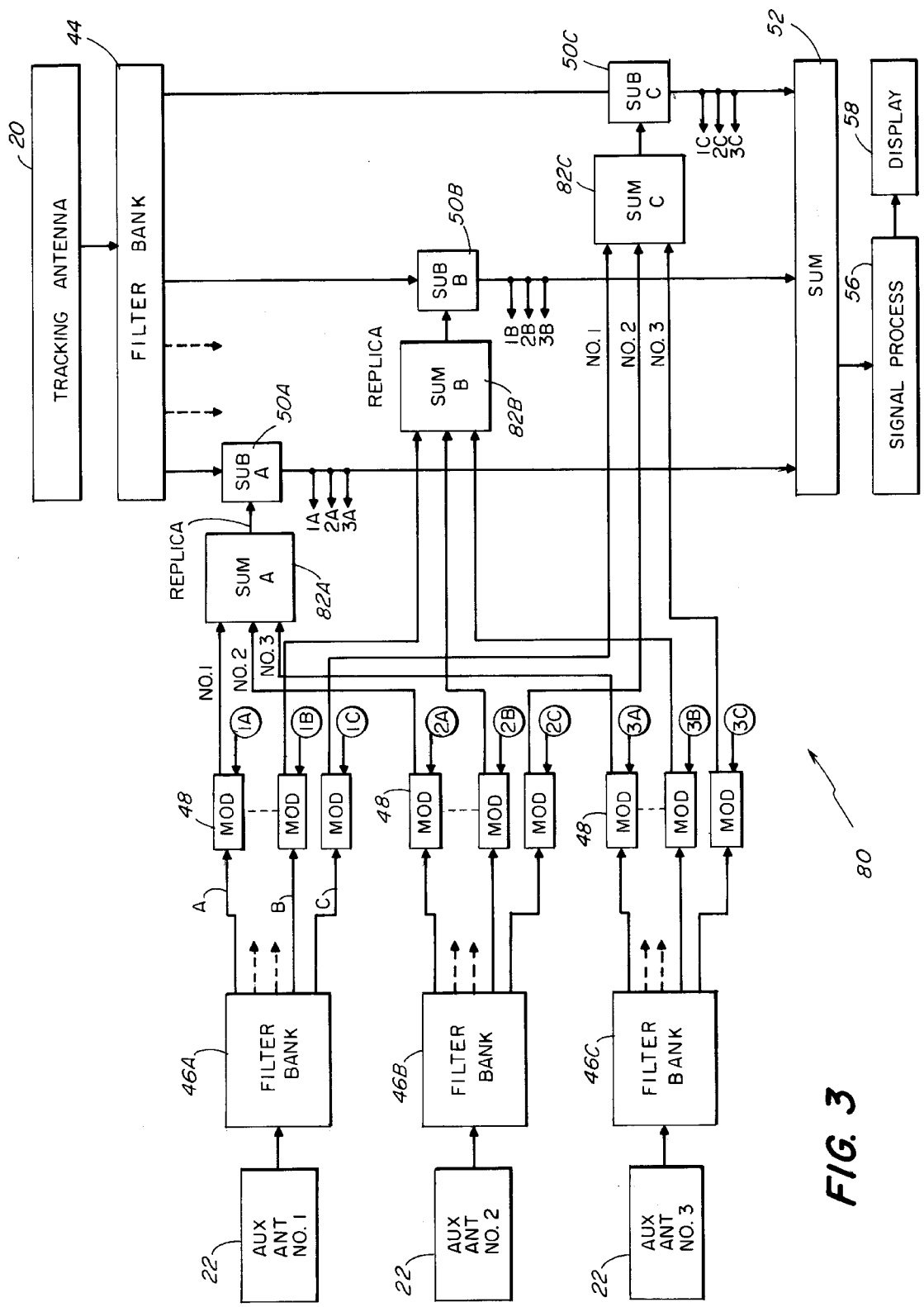
FIG. 3 is a block diagram of an alternative embodiment of the system of FIG. 2 for use with a plurality of auxiliary antennas.

Referring now to FIG. 3, there is shown a block diagram of a system 80 which employs the modulators 48 to produce a replica signal for cancellation of the jamming signal as was disclosed in FIGS. 1 and 2, the system 80 further incorporating two additional auxiliary antennas similar to the auxiliary antenna 22 of FIG. 1, the three auxiliary antennas each being identified in FIG. 3 by the legend 22, to provide improved cancellation of the jamming signal component present in the signal received by the main antenna 20 of FIG. 1. The system 80 comprises a set of filter banks such as the filter bank 46 of FIG. 2, the filter bank being identified in FIG. 3 by the legends 46A–C, coupled respectively to the auxiliary antennas 22 by amplifiers (not shown) such as the amplifier 42 of FIG. 2. The tracking antenna 20 is coupled by an amplifier (not shown) such as the amplifier 40 of FIG. 2 to the filter bank 44 as was previously disclosed in FIG. 2. The signals appearing at the output terminals of the filter bank 44 are each individually processed by separate channels, three such channels A, B and C being shown in FIG. 3, in a manner similar to that disclosed previously with reference to FIG. 2 wherein the subtractors 50A–C are utilized both in FIGS. 2 and 3 for subtracting a replica signal in each channel from the signal of the corresponding output terminal of the filter bank 44. The summer 52, the signal processor 56 and the display 58 operate in FIG. 3 in the same manner as disclosed previously in FIG. 2.

The system 80 of FIG. 3 further incorporates a set of summers 82, each of which is further identified by the legends A–C when it is desired to refer to a specific one of the summers 82, which are coupled to the replica input terminal respectively of the subtractors 50A–C in each of the three channels. Comparing FIGS. 2 and 3, it is seen that in FIG. 2 each modulator 48 is coupled directly to the subtractor 50 of a signal processing channel such as the coupling of the modulator 48A to the subtractor 50A in channel A. In FIG. 3, since there is an equal set of modulators 48 for each of the auxiliary antennas 22, the signals of the corresponding modulators 48 from each of the sets of modulators 48 are first summed together by a summer 82, and the cancelled signals produced by the corresponding subtractor 50 is coupled back to input terminals of these modulators. In order to identify the input terminals of the various modulators 48 to which the cancelled signals of the subtractors 50 are coupled, the terminals of the modulators 48 are identified by the legends 1A–C, 2A–C and 3A–C wherein the numerals 1, 2 and 3 identify the first, second or third auxiliary antenna 22 while the letters A, B and C identify the signal processing channel for which the output signal of each of the modulators 48 is utilized in producing the replica signal. Thus, it is seen that the modulators having terminals 1A, 2A and 3A are coupled to the summer 82A, the modulators having the terminals 1B, 2B and 3B are coupled to the summer 82B, and the modulators having terminals 1C, 2C and 3C are coupled to the summer 82C.

In a typical installation for the system 80 of FIG. 3, the three auxiliary antennas 22 would be positioned about the main antenna 20 of FIG. 1, for example, at the locations corresponding to the vertices of an equilateral triangle centered on the main antenna 20. It is readily appreciated that for a given location of the source 28 of FIG. 1, the delay time between the times of arrival of the jamming signal at the first, the second and the third auxiliary antenna 22 as compared to the time of arrival of the jamming signal at the main antenna 20 would differ such that a zero time delay with respect to one of the auxiliary antennas 22 would correspond to a near maximum time delay relative to another of the auxiliary antennas 22. As a result of the combination of the signals of the three auxiliary antennas 22, the replica signal produced in each of the channels is based on an average value of the time delay of the graphs 31–34 of FIG. 1 as that time delay pertains to each of the individual ones of the auxiliary antennas 22 of FIG. 3. Accordingly, it is seen that the generation of the replica signal in FIG. 3 is based upon a correlation, such as that disclosed with reference to the graphs 31–34, which is better than the correlation obtained with the maximum time delay.

It is understood that the above-described embodiments of the invention are illustrative only and that modifications thereof may occur to those skilled in the art. Accordingly, it is desired that this invention is not to be limited to the embodiments disclosed herein but is to be limited only as defined by the appended claims.

What is claimed is:

1. A radar system comprising:

a main antenna having a radiation pattern composed of a main lobe and sidelobes wherein the signal gain of a sidelobe is less than the signal gain of the main lobe;

an auxiliary antenna having an omnidirectional radiation pattern;

first and second filter banks each of which comprises a set of bandpass filters, said first filter bank being coupled to said main antenna and said second filter bank being coupled to said auxiliary antenna;

a set of subtraction units, individual ones of said subtraction units being coupled to individual ones of said bandpass filters of said main antenna, one of said subtraction units forming the difference between a replica signal and a signal of the bandpass filter which is coupled to said one subtraction unit;

a summing unit for summing together the output signals of said subtraction units to produce a received friendly signal; and replica generation means for generating said replica signal, said generation means comprising inphase and quadrature detectors of output signals of said subtraction units, signals of said second filter bank serving as references for said detectors, and means coupled to the output terminals of said detectors for modulating signals of said second filter bank with inphase and quadrature signals of said detectors for producing said replica signal.

2. A system comprising:

main antenna means responsive to a first sum of first and second signals incident upon said main antenna means;

auxiliary antenna means responsive to a second sum of first and second signals incident thereupon;

means for extracting a plurality of spectral portions of said first sum and a plurality of corresponding spectral portions of said second sum, the bandwidth of each of said spectral portions being equal to the bandwidth of the corresponding one of said spectral portions;

arithmetic means responsive to a replica of said second signal in said first sum and coupled to said extracting means for subtracting out a replica of spectral portions of said second signal of said first sum from corresponding spectral portions of said first sum to produce a cancelled signal; and means for comparing spectral portions of said cancelled signal with the corresponding spectral portions of said second sum to produce said replica.

3. A system according to claim 2 wherein said comparing means includes means for deriving a complex factor representing a comparison by said comparing means, and means for multiplying one of said spectral portions of said second sum by said complex factor.

4. A system according to claim 3 wherein said complex factor providing means includes means for filtering a signal resulting from said comparison.

5. A system for processing a sum signal composed of a first signal and a second signal to cancel said second signal from said sum signal comprising:

first and second receiving means located for receiving said sum signal, said second receiving means being configured to receive a stronger component of said second signal in said sum signal than is received by said first receiving means;

first and second filter systems coupled respectively to said first and second receiving means, each of said filter systems being responsive to signal components in contiguous spectral bands for delaying spectral components of one of said first and second signals in each of said spectral bands such that the waveform of an output signal of said second filter system is substantially correlated with the waveform of an output signal of said first filter system;

means for combining an output signal of said second filter system with a cancelled signal to provide a replica of said second signal, said combining means including means for synchronously detecting said second signal in said output signal of said second filter system with a residue of said second signal in said cancelled signal to provide said replica; and means coupled between said combining means and said first filter system for subtracting said replica from an output signal of said first filter system to produce said cancelled signal.

6. In combination:

first and second receiving means for receiving an incoming signal, said incoming signal comprising a first signal and a second signal, the magnitude of said second signal as received by said second receiving means being larger than the magnitude of said first signal as received by said second receiving means;

means coupled to said first and said second receiving means for altering the temporal relationship between corresponding spectral portions of signals received by said first and said second receiving means so that spectral portions of said second signal as received by said first receiving means are substantially correlated with the corresponding spectral portions of said second signal as received by said second receiving means, said altering means having a first output port providing a first output signal composed of the spectral portions of said incoming signal as received by said first receiving means, and a second output port providing a second output signal composed of the spectral portions of said incoming signal as received by said second receiving means;

means coupled to said first output port of said altering means for subtracting a replica of said second signal from said first output signal to produce a cancelled signal composed of said said first signal and a residue of said second signal; and means coupled between said second output port of said altering means and said subtracting means and responsive to said residue for combining said cancelled signal with said second output signal to produce said replica.

7. A combination according to claim 6 wherein said combining means includes a synchronous detector coupled to said cancelled signal, the second signal component of said second output signal serving as a reference to said detector for detecting the residue of said cancelled signal, said combining means further comprising means for multiplying said reference by the detected residue to produce said replica.

* * * * *